United States Patent [19]
Nichols

[11] 3,753,095
[45] Aug. 14, 1973

[54] BATTERY TESTER HAVING A PLIABLE RESILIENT BODY MEMBER FOR ACCOMODATING THE BATTERY TO BE TESTED

[76] Inventor: Nathan P. Nichols, 121 Nichols St., Danvers, Mass.

[22] Filed: Feb. 16, 1971

[21] Appl. No.: 115,261

[52] U.S. Cl. .............................. 324/29.5, 339/61 R
[51] Int. Cl. ...................... H01m 31/04, G01r 31/00
[58] Field of Search ................. 324/29.5, 72.5, 133, 324/51, 53; 240/6.4; 339/59, 61, 213, 113 L; 340/249

[56] References Cited
UNITED STATES PATENTS

| | | | |
|---|---|---|---|
| 2,503,677 | 4/1950 | McHenry et al. | 339/113 L X |
| 3,076,950 | 2/1963 | Pavlick | 339/61 L |
| 3,454,873 | 7/1969 | Abrahams | 324/29.5 |
| 2,195,975 | 4/1940 | Ribble | 324/51 X |
| 2,522,660 | 9/1950 | Bledsoe | 324/29.5 |
| 2,694,772 | 11/1954 | Gelardin | 240/6.4 R |
| 3,119,564 | 1/1964 | Zalman | 240/6.4 R |
| 3,256,428 | 6/1966 | Schwartz | 240/6.4 R |
| 3,508,041 | 4/1970 | Sweany et al. | 240/6.4 W |

Primary Examiner—Gerard R. Strecker
Attorney—Edgar O. Rost

[57] ABSTRACT

A detectable energy indicating means is disclosed having structure adapted to receive disc or button shaped energy sources such as, for example, those utilized for hearing aids. Encapsulated electrical current visual or audible sensing means serially connected to conductive contact means are assembled in an integral body of durable, pliable, and resilient thermoplastic or rubber materials. Translucent viewing means are defined in the body member to permit observation of the relative intensity of illumination of, for example, a light bulb sensor. Alternative embodiments provide for snap-in mounting of the tester in multiple battery cartwheel type packages for merchandising of the batteries as well as a handy rugged pocket unit for the individual user.

12 Claims, 6 Drawing Figures

PATENTED AUG 14 1973 3,753,095

BATTERY TESTER HAVING A PLIABLE RESILIENT BODY MEMBER FOR ACCOMODATING THE BATTERY TO BE TESTED

BACKGROUND OF THE INVENTION

1. Field of the Invention

The invention relates to battery testers or checkers and, more particularly, to such apparatus for hearing aid batteries of the disc or button type.

2. Description of the Prior Art

Apparatus for testing the conventional cylindrical dry cell batteries having terminals have incorporated therein spring loaded mechanisms coupled with voltmeters or ammeters to indicate the operational status. Such apparatus is both costly and cumbersome and not readily adaptable to different battery sizes. In the hearing aid field energy sources of illustratively, a silver or mercury composition have evolved. Such sources commonly are of a disc or button shape defining a circular body having parallel opposing faces without any terminals. It has been difficult, therefore, to employ prior art testing devices for hearing aid batteries due to the absence of contact terminals and the small size of the product to be tested.

A need exists, therefore, for simple, portable, inexpensive apparatus for testing hearing aid batteries.

SUMMARY OF THE INVENTION

In accordance with the teachings of the present invention a hollow body casing member of a pliable resilient thermoplastic or rubber material houses a receptacle adapted to receive the battery and a cavity for the sensing means. Electrically conductive means such as, for example, the leads from an unbased light bulb are secured in the body wall portion adjacent to the battery receptacle. Such leads form spaced parallel contact means flexibly engaging opposing parallel faces of a disc type battery as a portion is inserted within the receptacle. The flexibility thereby provided readily adapts the tester to any axial length of the battery tested.

The intensity of illumination of the light bulb may be directly viewed to determine the status of operational life expectancy. Alternatively, it is possible to incorporate translucent viewing means in the body casing wall adjacent to the sensor. With a step configuration having varying wall thicknesses the viewing means permit visual differentiation between, for example, silver and mercury sources, as well as short life expectancy.

The invention also permits the utilization of audible devices, such as buzzers and the like, with a similar lead contact arrangement in the flexible body engaging portions. The wide variety of thermoplastic and rubber materials facilitate simplified fabrication with molding techniques at low cost. The embodiments can also be provided in a wide selection of colors and the outer wall surfaces may bear any desired advertising media for use in giveaway promotional campaigns. Functional devices, such as key rings or articles or jewelry, may be combined with the disclosed embodiments of the invention. Additionally any desired body configuration may be employed including elongated cylindrical embodiments with the testing receptacle and sensing means being arranged in-line. Button or disc type removable circular body casing members may be employed for snap-in mounting arrangements in larger packages to provide in an integral structure a supply of energy sources, as well as the testing means.

BRIEF DESCRIPTION OF THE DRAWINGS

The invention as well as varied illustrative embodiments will now be described with reference being directed to the accompanying drawings, wherein.

DESCRIPTION OF THE PREFERRED EMBODIMENTS

Figure 1:
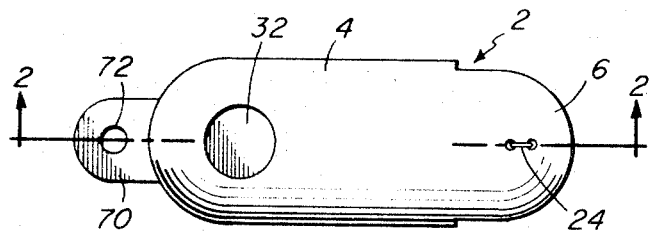
FIG. 1 is a top elevational view of an embodiment of the invention.
Figure 2:
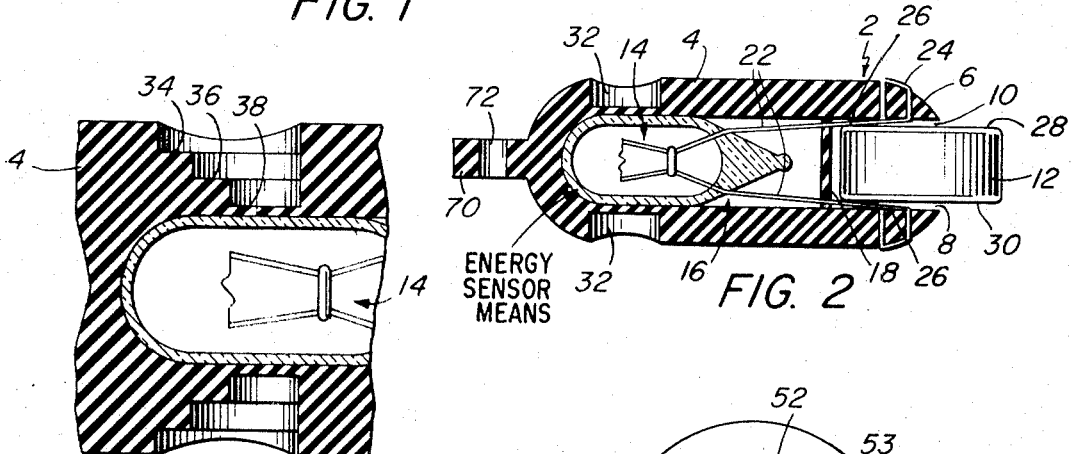
FIG. 2 is a cross-sectional view taken along the line 2—2 in FIG. 1.

Referring to the drawings, FIGS. 1 & 2 illustrate the embodiment of the invention 2 comprising an elongated cylindrical body casing member 4 of a pliable resilient material defining adjacent one end a pair of flexible oppositely disposed spaced arms 6 having substantially planar faces 8. The arms 6 define therebetween a receptacle 10 to receive a portion of battery 12. The receptacle has flexible walls adapted to accommodate the axial length of any disc type battery. Suggested thermoplastic materials for molding the body casing member 4 include polyvinylchloride. Any moldable rubber materials such as silastic rubber may also be utilized.

The energy sensing means are provided by an exemplary detection means, such as a 1.35 volt-2.5 volt unbased light bulb 14 disposed within cavity 16 defined behind wall 18. The spacing between arms 6 is selected to provide a receptacle 10 whose walls flexibly engage the opposing parallel flat planar walls 28 and 30 of battery 12. Light bulb sensor 14 comprises a pair of electrically conductive leads 22 suitably anchored to arms 6 by loops 24 with portions 26 operatively associated with battery 12. Viewing means in the form of a translucent wall 32 are provided in close proximity to light bulb sensor 14. If desired this wall may be omitted and the light bulb viewed directly through an aperture.

Figure 3:
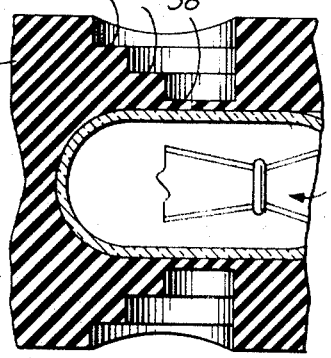
FIG. 3 is an enlarged fragmentary cross-sectional view of an alternative embodiment of the viewing means for utilization in embodiments similar to FIGS. 1 & 2.

In FIG. 3 an alternative embodiment of the viewing means is illustrated. A step arrangement within the appropriate portion of body memeber 4 defines gradually reducing sections 34, 36 and 38. In accordance with predetermined dimensions these sections can assist in the determination of the relative strength of battery 12. Hence, a silver energy source will produce a bright light visible through even the thickest section 34 while a mercury source would produce a less brilliant light visible only through section 38. A short life expectancy will be indicated by a less brilliant or no light.

Figure 4:
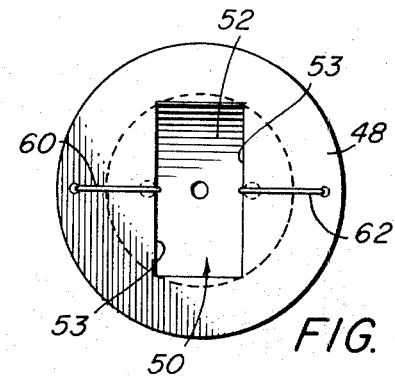
FIG. 4 is a top elevational view of an alternative illustrative embodiment.
Figure 5:
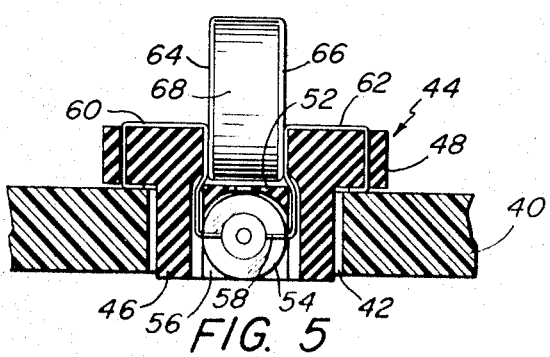
FIG. 5 is a cross-sectional view of the embodiment of FIG. 4 shown in a snap-in mounting arrangement.

In FIGS. 4 and 5 another embodiment of the invention is shown for mounting within a plural source dispensing arrangement having, for example, a planar plastic translucent body 40 defining an aperture 42. The embodiment 44 of a similar composition as that described in conjunction with the preceding views has a circular configuration with a main body portion 46 dimensioned to provide a snug fit in aperture 42. A lip portion 48 prevents the battery tester from dropping through the aperture. The battery accommodating receptacle 50 is provided with substantially a curved conforming bottom wall 52 and parallel side walls 53.

A light bulb sensor 54 is disposed with a cavity 56 behind wall 52. In this embodiment the bulb sensor is oriented perpendicularly to the axis of the body portion 46 to evolve a more compact structure. Leads 58 extend through apertures in wall 52 and are anchored by loops 60 & 62 to lip portion 48. The opposing parallel portions of leads 58 engaging walls 53 flexibly engage the opposing parallel planar walls 64 and 66 of battery 68.

Figure 6:
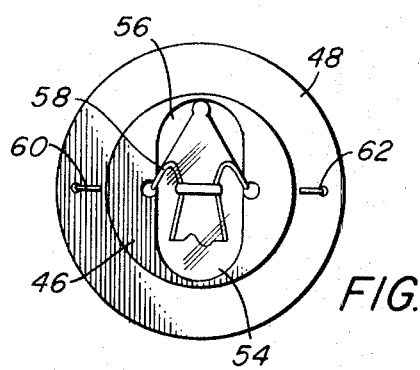
FIG. 6 is a bottom elevational view of the embodiment shown in FIGS. 4 and 5 illustrative of direct viewing of the sensing means.

FIG. 6 illustrates an alternative embodiment and the light bulb sensor, 54 may be viewed directly by turning the battery tester over the other side. The cavity 56 may also be adapted to incorporate a higher voltage larger bulb sensor, for example, the 2.5 volt size. As in the preceding embodiment it is possible to exert a slight finger pressure on the pliable resilient walls adjacent the battery receptacle to assure good electrical contact. In addition it is a simple matter to incorporate any other electrically conductive lead bearing devices such as a buzzer in place of bulb sensor 14 with similar results regarding battery operational expectancy based on the amount of audible sound produced.

There is thus disclosed a unique and novel battery tester for disc or button shaped energy sources in an integral body casing of a durable pliable resilient all weatherproof material. The invention may also find application as an electrical continuity tester for other electrical apparatus where a tight fit is provided by flexible means bearing electrically conductive means. In other applications any of the well known electrically conductive metallic tapes may be utilized on the surface engaging walls of the receptacles.

A large selection of molding materials are readily available for use in the practice of the invention. The outer walls of the cylindrical embodiment shown in FIG. 1 may also be utilized for displaying any advertising media incorporated in the mold. A tab 70 may also be appended at one end of the cylindrical body member 4 in FIG. 1 with an aperture 72 to receive, for example, a key chain or ring, or any item of jewelry such as a medallion or pendant. Again advertising media could be appended to means secured to tab 70.

The invention is simple to use and inexpensive to manufacture. Many other variations, modification are alterations will become evident to those skilled in the art. It is intended therefore, that the foregoing description of illustrative embodiments of the invention be interpreted broadly and not in a limiting sense.

What is claimed is:

1. In combination:
    a disc shaped electrical energy source having opposing planar walls;
    a body member of a pliable resilient material having spaced straight wall structure defining an open-ended receptacle to accommodate said opposing planar walls of said energy source; and
    detectable energy indicating means carried by said body member having electrical leads in opposite receptacle walls simultaneously contacting said opposing planar walls when said energy source is inserted into said receptacle.

2. In combination:
    a disc shaped electrical energy source having opposing planar walls;
    a cylindrical elongated body member of a pliable resilient material having spaced straight wall structure defining an open-ended receptacle dimensioned to accommodate said opposing planar walls of said energy source; and
    detectable energy indicating means encased within said body member and having electrical leads mounted in opposite receptacle walls to simultaneously contact said opposing planar walls when said energy source is inserted into said receptacle.

3. In combination:
    a disc shaped electrical energy source having opposing planar walls;
    a circular body member of a pliable resilient material having spaced straight wall structure defining an open-ended receptacle dimensioned to accommodate said opposing planar walls of said energy source; and
    detectable energy indicating means disposed within said body member and having electrical leads mounted in opposite receptacle walls to simultaneously contact said opposing planar walls when said energy source is inserted into said receptacle.

4. A battery tester for a disc shaped battery comprising:
    a body member of a pliable resilient material having straight wall structure defining an open-ended receptacle having spaced parallel walls to receive and engage opposing planar walls of said battery; and
    energy sensing means housed within a cavity in said body member and having electrical leads anchored at one end to opposite receptacle walls to simultaneously contact the opposing planar walls of said battery when inserted into said receptacle.

5. A battery tester according to claim 4 wherein said body member comprises a material having a thermoplastic composition.

6. A battery tester according to claim 4 wherein said body member comprises a rubber material.

7. A battery tester according to claim 4 wherein said sensing means comprise an unbased light bulb.

8. A battery tester according to claim 4 wherein said sensing means comprise an audible sound generator.

9. A tester according to claim 7 wherein viewing means are defined by a thin wall in said body member adjacent to said light bulb.

10. A tester according to claim 9 wherein said viewing means define a plurality of body member walls having varying thicknesses.

11. A tester according to claim 4 wherein said body member defines a tab portion having an aperture adjacent to said cavity.

12. A tester for a disc shaped battery comprising
    a circular body member of a pliable resilient material having a main portion defining an open-ended cavity and an enlarged lip portion defining a receptacle having a curved bottom wall and parallel spaced straight sidewalls to accommodate opposing planar walls of said battery; and
    an unbased light bulb disposed within said cavity and having electrically conductive leads attached to opposite sidewalls to simultaneously contact said opposing planar walls when said battery is inserted into said receptacle.

* * * * *